Nov. 21, 1939.  C. G. HOLT  2,180,633
SCREW HEAD
Filed July 19, 1938
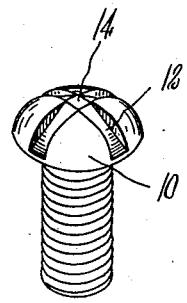
Fig. 1.
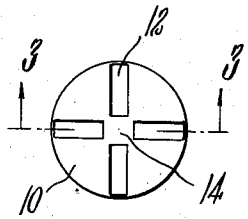
Fig. 2.
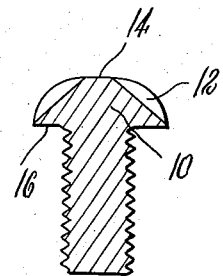
Fig. 3.
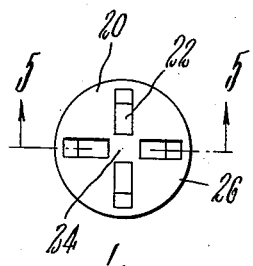
Fig. 4.
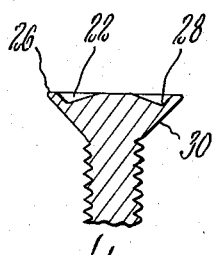
Fig. 5.
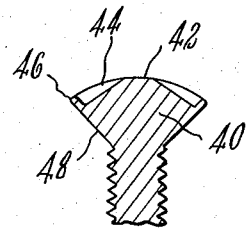
Fig. 6.
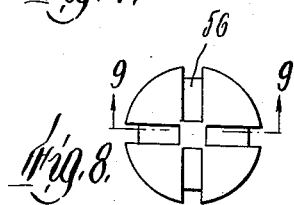
Fig. 8.
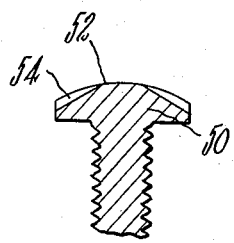
Fig. 7.
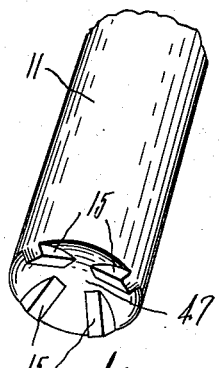
Fig. 11.
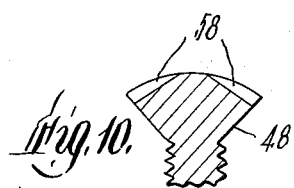
Fig. 9.
Fig. 10.
Inventor
Clarence G. Holt
by Wright, Brown, Quinby & May
Attys Patented Nov. 21, 1939

2,180,633

UNITED STATES PATENT OFFICE 2,180,633

SCREW HEAD

Clarence G. Holt, Melrose, Mass.

Application July 19, 1938, Serial No. 220,024

5 Claims. (Cl. 85—45)

This invention relates to improved screw head adapted to be engaged by a special complementary tool for rotation of the screw.

It is an object of the invention to provide a screw head which cannot be operatively engaged by an ordinary screwdriver. It is a further object of the invention to provide slots or recesses in the head so shaped as to minimize slippage of the tool and to afford an efficient leverage for rotation of the screw.

For a more complete understanding of the invention, reference may be had to the following description of certain embodiments thereof, and to the drawing, of which Figure 1 is a perspective view of a round-headed screw embodying the invention.

Figure 2 is a plan view of the same.

Figure 3 is a sectional view on the line 3—3 of Figure 2.

Figure 4 is a plan view of a flat-headed screw embodying the invention.

Figure 5 is a sectional view on the line 5—5 of Figure 4.

Figure 6 is a sectional view of a screw with an oval head.

Figure 7 is a sectional view of a screw with a binding head.

Figure 8 is a plan view of a flat-headed screw with modified grooves or slots therein.

Figure 9 is a section on the line 9—9 of Figure 8.

Figure 10 is a sectional view of a screw with an oval head having modified grooves or slots therein.

Figure 11 is a perspective view of a tool for use with screws such as are illustrated in Figures 3, 6, 7 and 9.

The invention as illustrated is embodied in screw heads having the customary shapes or surface contours, some one of which is found on practically all screws now on the market.

The screw shown in Figure 1 has a head 10 which is characterized by a plurality of slots or grooves extending radially from an unrecessed central surface portion 14 which lies in the contour of the screw head. Because of this central surface portion, the screw cannot be operatively engaged by an ordinary screwdriver but must be rotated by a special tool 11 having complementary lugs or ridges 15 adapted to fit into the grooves or slots 12. As indicated in Figures 1 and 2, it is preferred to employ four slots 12 in order to give ample purchase on the screw head for the tool without unduly weakening the head itself by the removal of too much material, but a greater or lesser number of slots may be employed. As shown in Figure 2, the side walls of each slot are parallel. Thus the side walls of each of the lugs 15 are parallel. This detail of structure is of great practical importance in that slots of this kind having parallel side walls are more securely engaged by a complementary tool than are slots having diverging side walls. Thus in the case of the screw heads illustrated on the drawing, there is minimum possibility of slipping of the tool when the screw is being rotated thereby. The lugs 15 are preferably made of such thickness as to have a frictional fit in the slots. By using a cold-forging process in making the screws, the slots can be made with a high degree of accuracy to have a uniform width. Hence the frictional fit serves to hold the screw head in the end socket of the tool so that the screw is supported by the tool when the lugs are pushed into the grooves. In the screw illustrated in Figures 1, 2 and 3, the bottom of each slot starts flush with the central area 14 and slopes radially outward and downward in a straight line therefrom but leaves a continuous shoulder 16 under the head of the screw. The outward and downward slope of the groove bottoms serves to center the tool when it is thrust against the screw head.

Figures 4 and 5 illustrate a flat-headed screw in which the head 20 has a plane upper surface interrupted by four grooves 22 which extend from an unrecessed central surface portion 24 nearly to the peripheral edge 26 of the head. Since these slots do not extend all of the way to this edge, the edge is unbroken and forms a complete circle which lies in a common plane with the central portion 24. The bottom of each slot slopes downwardly toward the periphery of the head, as indicated in Figure 5, for most of the length of the slot, and then slopes upwardly to its outer end adjacent to the edge 26 of the head. Thus the deepest point 28 of each slot comes as far from the axis of the screw as is possible without breaking the continuity of the edge 26 or of the conical under face 30 of the head. This results in a maximum arm of rotation for each of the driving lugs of a complementary tool.

Figure 6 illustrates in section a screw having an oval head, that is, a head with a curved contour on top and a conical contour underneath. The central area 42 is unrecessed, that is, it lies in the contour of the top and the slots 44 extend radially therefrom toward the peripheral edge 46 of the head. The side walls of each of these slots are parallel, and the bottom slopes downwardly toward the edge of the head for most of the length of the slot, and then upwardly near the edge so that the peripheral edge 46 is unbroken. The tool illustrated in Figure 11 is shaped particularly for this screw head. Each lug 15 fits snugly in one of the slots 44 and the end face of the tool is recessed as at 47 to receive the curved upper surface of the screw head.

A screw with a binding or fillister head 50 is shown in Figure 7. This screw has a curved upper contour and a cylindrical side. The central surface area 52 is unrecessed so that it lies in the contour of the top and from it a plurality of slots, preferably four, extend radially, each slot having parallel side walls and a bottom which slopes downwardly in a straight line away from the central area 52 to the periphery of the head.

In each of the screw heads illustrated in the drawing, the bottoms of the slots make angles with the axis of the screw which are greater than 45°. This feature not only facilitates manufacture but is helpful in centering the driving tool.

Instead of making flat-headed and oval-headed screws with slots stopping short of the peripheral edge of the head as shown in Figures 4, 5 and 6, I may extend the slots through so that they open out on the conical under face or shoulder of the screw as shown in Figures 8, 9 and 10. Figures 8 and 9 show a flat head similar to that shown in Figures 4 and 5 except that the slots 56 have bottoms which slope down until they open out at the under face 30. In like manner, Figure 10 illustrates an oval head similar to that shown in Figure 6, except that the slots 58 open out at the conical under face 48.

It is evident that various other specific shapes of screw heads may be formed with slots embodying the invention, those illustrated on the drawing being by way of example and not limitation.

I claim:

1. A screw head having a substantial unrecessed central surface portion, said head having a plurality of grooves extending radially from said central surface portion, each said groove having parallel side walls and a bottom which slopes downward from the center of the head for most of the length of the slot then slopes up near the periphery of the head.

2. A flat screw head having an unbroken peripheral edge and a central surface portion in the same plane with said edge, said head having four grooves extending radially from said central surface portion nearly to said edge, each said groove having parallel side walls and a bottom which slopes downward away from the center of the head then upward near said edge.

3. A screw having a substantial unrecessed central surface portion, said head having a plurality of grooves extending radially outward from said central portion, each groove having parallel side walls and a straight bottom sloping outward and downward toward the periphery of the head.

4. A screw head having a convex top surface with an unrecessed central portion, said head having four grooves therein extending radially from said central portion and disposed in symmetrical relation around the head with equiangular spacing between them, each said groove having parallel side walls and a straight bottom sloping radially outward and downward, whereby centering of a driving tool on said head is facilitated and a minimum removal of material from the head is secured.

5. A screw head having a substantial unrecessed surface portion, said head having four radial grooves extending symmetrically from said central surface portion, each said groove having parallel side walls and a straight bottom starting flush with said central surface portion and sliping radially outward and downward therefrom at an angle of more than 45° with the axis of the screw.

CLARENCE G. HOLT.